June 21, 1949. C. W. BOONE 2,473,782
TRACTION DEVICE

Filed Sept. 24, 1946 2 Sheets-Sheet 1

INVENTOR.
CLARENCE W. BOONE
BY Bodell & Thompson
ATTORNEYS

June 21, 1949.   C. W. BOONE   2,473,782
TRACTION DEVICE

Filed Sept. 24, 1946                           2 Sheets-Sheet 2

INVENTOR.
CLARENCE W. BOONE
BY Bodell & Thompson
ATTORNEYS

Patented June 21, 1949

2,473,782

UNITED STATES PATENT OFFICE 2,473,782

TRACTION DEVICE

Clarence W. Boone, Syracuse, N. Y.

Application September 24, 1946, Serial No. 699,027

3 Claims. (Cl. 152—220)

This invention relates to a traction device for vehicle wheels, particularly the driving wheels, on motor trucks and the like.

The most common traction device now used is the conventional tire chain. It is a time consuming and difficult job to put the tire chains on the wheels of a vehicle, especially a vehicle having dual wheels and, if the chains are run on paved roads, they wear out very quickly.

In many trucking operations, especially trucking materials to new construction jobs, there are short distances where it is necessary to drive the truck over the bare ground, whereby the traction is greatly reduced and any slipping of the driving wheels will quickly cause the heavily loaded truck to dig in the soft dirt and become stalled. Under such conditions, the application and removal of tire chains for use on the short distances, from the pavement to the job, would cause extensive delay in the operation of the trucks, with the result that most truck drivers do not bother to put chains on for this short distance, and the ultimate result is that much delay is encountered by the trucks becoming stalled.

This invention has as an object a traction device comprising a number of traction shoes and means whereby they can be quickly and conveniently applied to the driving wheels of the vehicle, and which may be left on, if the vehicle is driven moderate distances on paved roads, without doing any harm to the vehicle, or the road, and if so used, the wear on the traction device, or the shoes thereof is negligible compared with the wear on conventional tire chains under the same use.

The invention consists in the novel features and in the combinations and constructions hereinafter set forth and claimed.

In describing this invention, reference is had to the accompanying drawings in which like characters designate corresponding parts in all the views.

Figure 1:
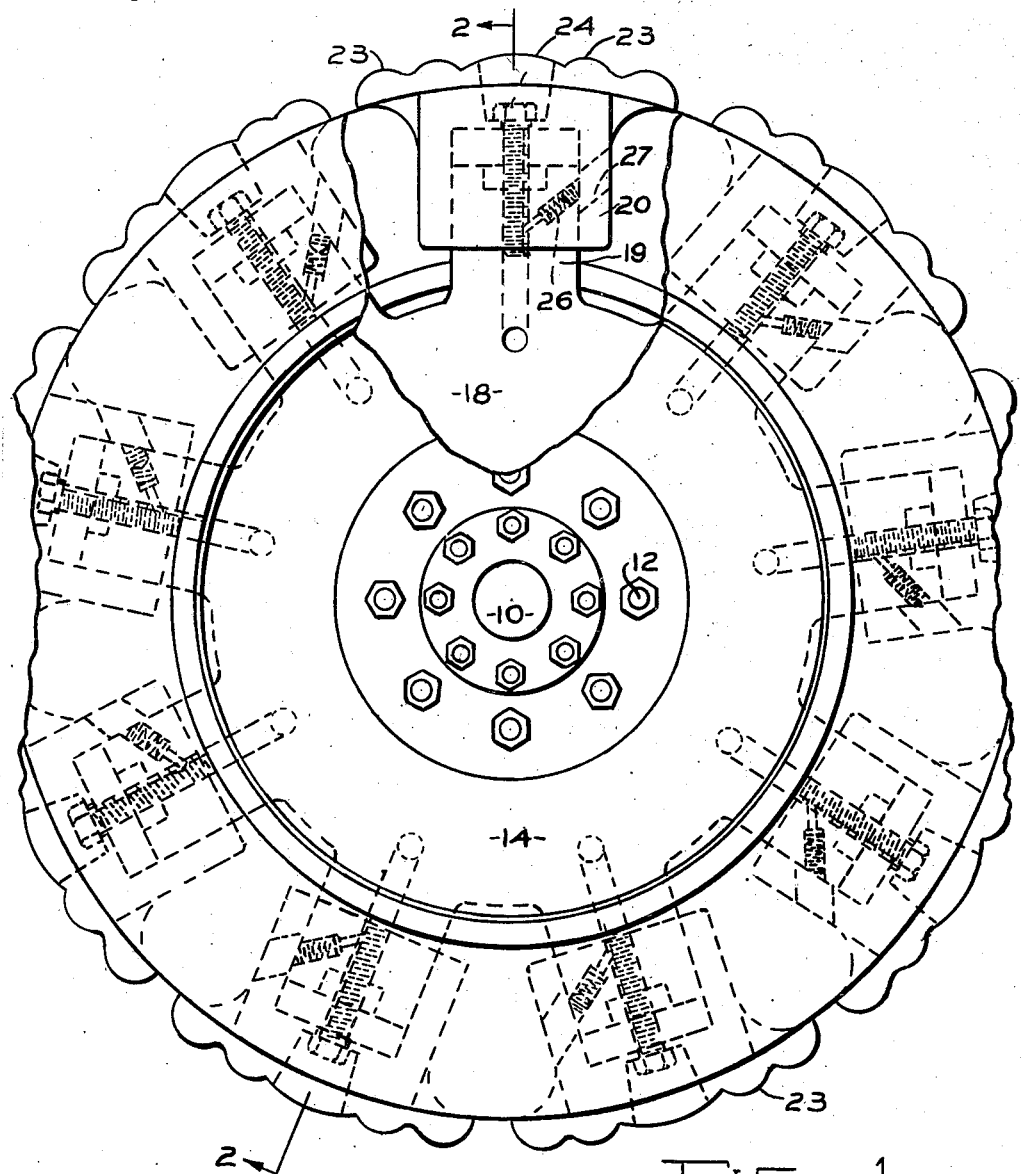
Figure 1 is a side elevational view of a traction device of my invention attached to a vehicle wheel, with parts of the wheel broken away.

10 designates the driving axle or member of the vehicle, and is formed with a radial flange 11 carrying a plurality of studs 12 by which the wheels 13, 14, are detachably mounted on the driving member. The structure shown is what is commonly known as a "dual wheel," the wheels 13, 14, being provided with pneumatic tires 15, 16.

The traction device comprises a member arranged between the wheels and rotatable therewith. As shown in the drawing, this member is in the form of a disk 18 positioned between the wheels 13 and 14 and rotatably secured to the driving member 10 by the studs 12. The disk 18 is formed with a plurality of circumferentially spaced apart radially extending projections 19. These projections are arranged in juxtaposition to the side walls of the tires 15, 16, and terminate approximately at the center of the radial thickness of the tire. A traction shoe member is mounted upon each of the projections 19. These members have a rectangular stem portion 20 provided with a recess comparable to the formation of the projections 19 which, in the structure illustrated, is rectangular. Each of the traction shoes is provided with a ground engaging portion 21 extending transversely across the periphery of the tire on the wheel.

Figure 2:
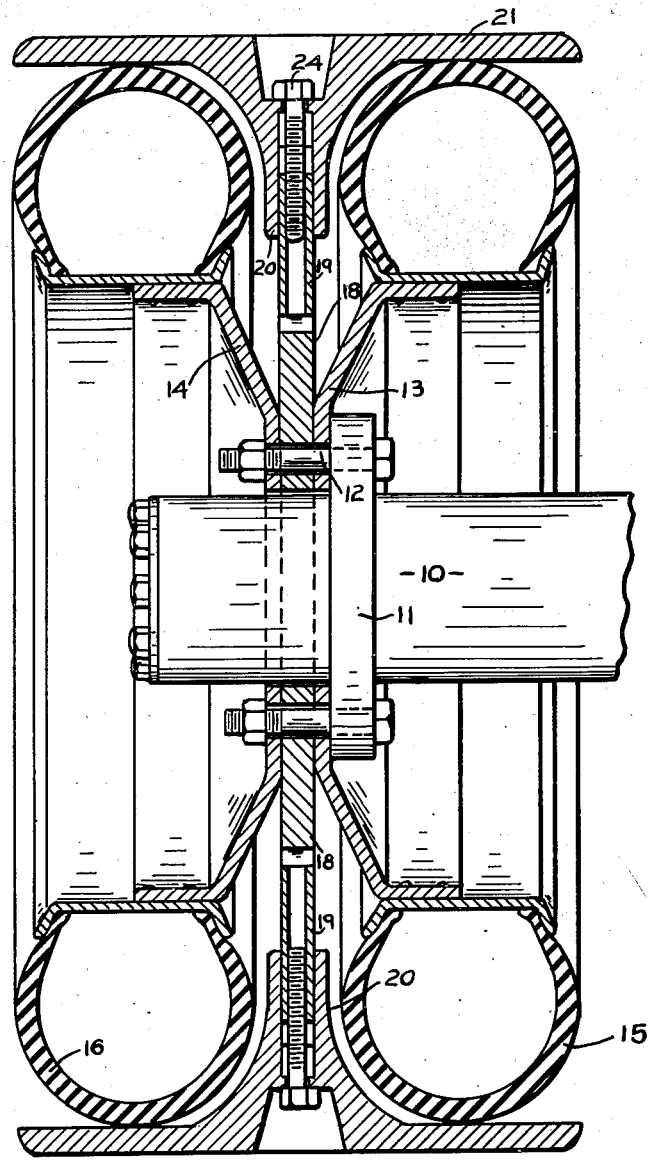
Figure 2 is a sectional view taken on line 2—2, Figure 1.

In the dual wheel strucuure, this portion extends transversely across both of the tires 15, 16, see Figure 2. This ground engaging portion of the shoes is preferably formed on its ground engaging surface with a plurality of transversely extending ribs 23, or otherwise formed to increase the tractive effect. The shoe members are slidably mounted upon the projections 19 so that they have radial movement inwardly and outwardly. The projections 19 are formed with centrally located threaded apertures to receive cap screws 24 extending through alined apertures in the shoe members, and the heads of the screws are positioned in counterbores extending below the ground engaging surface of the shoe.

The cap screws 24 provide a means for detachably mounting the shoes upon the carrying member 18, and also serve to limit the outward movement of the shoes caused by centrifugal force when the vehicle is under motion.

The projections 19 are also provided with threaded apertures extending transversely and at an inclined angle, see Figure 1, to receive a set screw 26 provided with a point engaging the cap screws 24 to prevent the same from loosening and working out of the projections 19. One side of the stem portion 20 of the shoes is provided with an enlarged aperture 27 to permit access to the set screws 26.

When the driving situations are such to require use of the traction device, the operator removes the screws 24 and slides the shoes on the projections 19, replaces the cap screws and tightens the set screws 26. A number of the shoes can be quickly and conveniently applied and the vehicle then moved ahead slightly, and the remaining shoes applied. Due to the fact that the traction shoes present a considerable area to the ground, or pavement, and are arranged in close proximity, they do not interfere with the operation of the vehicle on paved roads, nor do they damage the roads. Accordingly on a construction job, where the trucks are drawing stone, cement, etc., from a source of supply located within a few miles of the job, the traction shoes may be left on the vehicle and are then always available for difficult going in the soft ground.

I have found that it is preferable to replace the screws 24 in the projections 19 when the traction shoes are not in use as this prevents the threaded apertures in the projections from becoming filled up with dirt, or foreign matter, and thereby avoids any delay in attaching the shoes when they are needed.

The structure shown is very rugged and durable, and effects an entirely positive drive to the vehicle without sacrificing the advantages of the pneumatic tires.

What I claim is:

1. A traction device for vehicle wheels comprising a disk member secured to and rotatable with the wheel and having a plurality of circumferentially spaced apart radially extending projections non-circular in cross section, a traction shoe carried by each of said projections, each of said traction shoes having a stem portion formed with a recess complemental to said projections and slidably mounted thereon, said stem portions having laterally extending ground engaging portions extending over the periphery of the wheel, and means carried by each of said projections and cooperable with said traction shoes to limit the outward movement thereof.

2. A traction device for a vehicle dual wheel arrangement comprising a driving disk member arranged between the wheels and being secured thereto and rotatable therewith, said disk being formed with a plurality of circumferentially spaced apart radially extending projections non-circular in cross section, a traction shoe mounted on each of said projections, each of said shoes having a stem portion formed with a recess complemental to said projections and being slidably mounted thereon, a ground engaging portion extending laterally from each stem over the periphery of the wheels, a screw extending through each of said traction devices and threading into said projections and being operable to hold said laterally extending portions in engagement with the periphery of the wheels.

3. A traction device for a vehicle dual wheel arrangement comprising a driving disk arranged between the wheels and being secured thereto, said disk being formed with a plurality of radially extending projections terminating remote from the periphery of the wheels, said projections being rectangular in cross sectional form, a traction shoe carried by each of said projections, each of said shoes having a ground engaging portion extending laterally over the periphery of each of said wheels, and a stem portion extending inwardly and being formed with a recess complemental to said projections for telescopic action therewith, the ground engaging portion of each shoe being formed with a recess extending inwardly from the ground engaging surface thereof, a screw positioned in each of said recesses and being threaded into said projections and being cooperable to hold said shoes in engagement with the periphery of the wheels.

CLARENCE W. BOONE.

REFERENCES CITED

The following references are of record in the file of this patent:

UNITED STATES PATENTS

| Number | Name | Date |
| --- | --- | --- |
| 2,212,076 | Rollings | Aug. 20, 1940 |
| 2,304,424 | Schoniwitz | Dec. 8, 1942 |
| 2,312,486 | Riesen | Mar. 2, 1943 |